United States Patent [19]

Schwan

[11] 4,312,251
[45] Jan. 26, 1982

[54] CUTTING TOOL

[75] Inventor: Werner Schwan, Pohlheim, Fed. Rep. of Germany

[73] Assignee: Heyligenstaedt & Comp. Werkzeugmaschinenfabrik GmbH, Geissen, Fed. Rep. of Germany

[21] Appl. No.: 160,690

[22] Filed: Jun. 18, 1980

[30] Foreign Application Priority Data

Jul. 17, 1979 [DE] Fed. Rep. of Germany ....... 2928756

[51] Int. Cl.³ .......................... B23B 29/00; B26D 1/00
[52] U.S. Cl. .............................. 82/36 R; 82/DIG. 1; 407/11
[58] Field of Search ........ 82/1 R, 1 C, 36 R, DIG. 1; 407/11, 120

[56] References Cited

U.S. PATENT DOCUMENTS

| 2,161,570 | 6/1939 | Harris | 82/DIG. 1 |
| 2,641,047 | 6/1953 | Jackman | 407/11 |
| 3,077,802 | 2/1963 | Philip | 407/11 |
| 3,137,184 | 6/1964 | Meyers | 407/11 |
| 3,971,114 | 7/1976 | Dudley | 407/120 |
| 4,191,075 | 3/1980 | Morgunsky et al. | 82/36 R |

*Primary Examiner*—Harrison L. Hinson
*Attorney, Agent, or Firm*—Cantor and Singer

[57] ABSTRACT

A cutting tool for machine tools which has a coolant pipe within the clamp holder, a covering over at least a portion of the clamp holder with a space between the clamp holder and the covering, and coolant outlet holes from the pipe to the space. This provides efficient cooling of the cutting tool without allowing the coolant to come into direct contact with the cutting plate.

7 Claims, 2 Drawing Figures

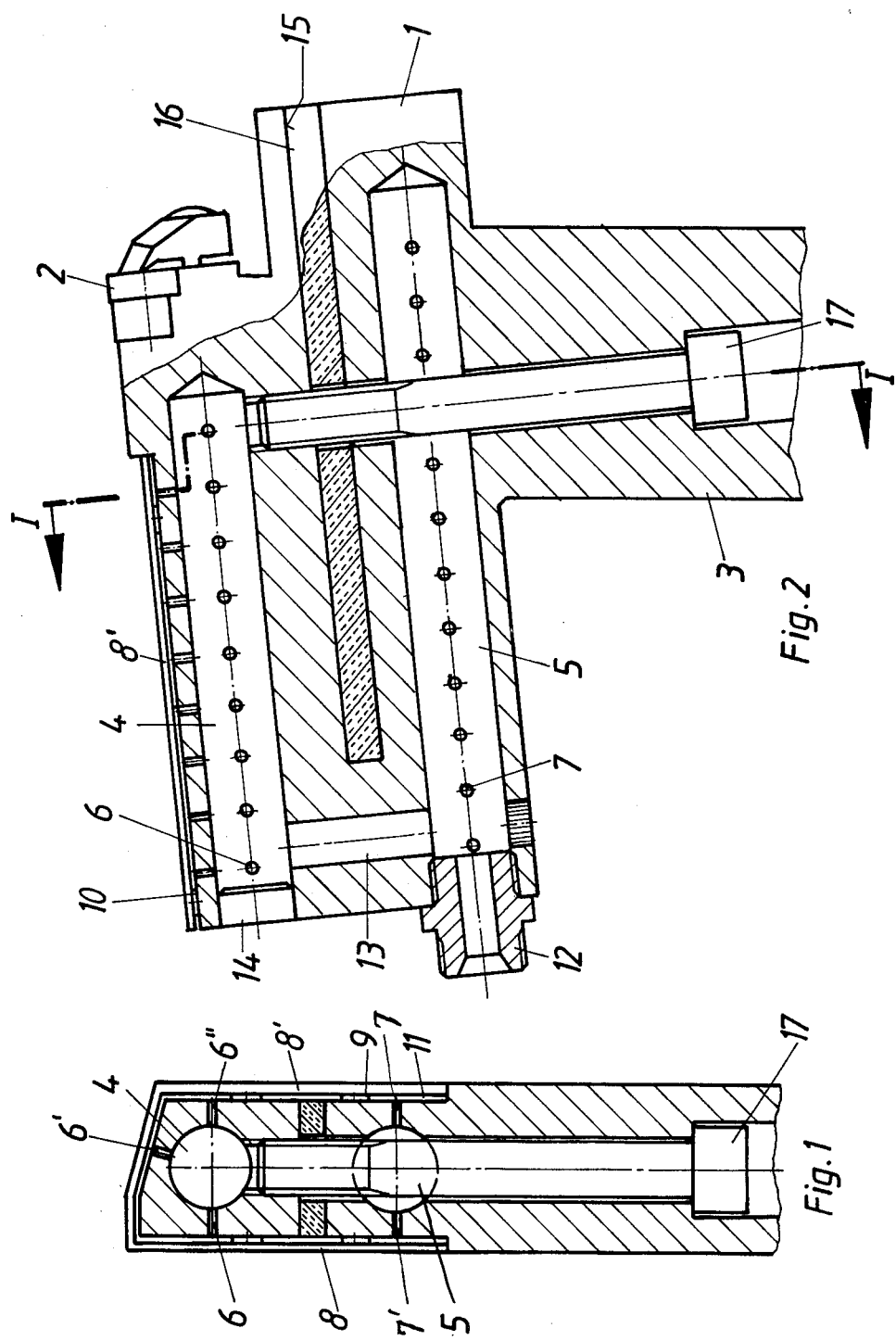

CUTTING TOOL

This invention relates to a cutting tool for machine tools in which at least one coolant pipe is provided. Such a cutting tool is for example described in German Offenlegungschrift No. 23 16 591.

With the previously known cutting tool a flow of coolant flows through the coolant pipe and sprays, for coolant purposes, directly onto the cutting plate of the cutting tool. More recently it has been customary to employ cutting tools whose cutting plates consist of ceramic or polycrystalline material. Using such cutting plates it is possible to achieve extremely high cutting rates without these becoming blunt in an undersirably short time.

As a result of the high cutting rates, during machining a great deal of heat is necessarily produced. Unfortunately ceramic or polycrystalline cutting plates cannot be cooled by water, because there would be a danger that the cutting plates would burst. It has even proved impossible to blow air against the cutting plate in order to cool it, because here too there is a danger that water droplets will pass with the air flow onto the cutting plate and cause it to burst.

Because of these difficulties during the cooling of cutting tools having cutting plates made of ceramic or polycrystalline material, hitherto these have been provided with no cooling at all. The result of this was that it has not been possible to utilise the high cutting rates which are as such possible, because otherwise the machine tool exhibits an undesirable temperature rise which would lead to machining errors.

The object of the invention is to so design the cutting tool of the type mentioned above that the heat formed during machining can be easily dissipated without danger of damage to the cutting edge or the cutting plate of the cutting tool. This task is solved by providing a cutting tool comprising at least one coolant pipe, a covering over at least part of the cutting tool and spaced therefrom, and a multiplicity of outlet holes from the coolant pipe into the space between the covering and the cutting tool.

The particular advantages of the invention lie in the fact that the cutting tool is cooled by the cooling medium both from the inside as a result of the coolant pipelines passing through it and the holes which are tapped off from this, and also from the outside, because after emerging from the holes the coolant flows between the covering and the cutting tool. By this means extremely intense cooling is obtained without it being necessary for the cooling medium to make direct contact with the cutting edge or the cutting plate. This ensures that the machine tool together with the cutting tool in accordance with the invention does not experience excessive heating and so give rise to machining errors.

A particularly large heat exchange surface and thus particularly intensive cooling of the cutting tool is achieved by the advantageous configuration of the invention wherein the covering is inserted in recesses of the cutting tool, and the space between the base surfaces of the recesses and the covering is open only to the side which faces away from the cutter of the cutting tool.

The refinement of the invention wherein the cutting tool has a slit which runs from one side transverse to its cutting edge in which a layer of thermal insulation is introduced and clamped by means of a bolt which passes transverse to the slit is also favorable. By this means it is ensured that during short peak loadings the heat forming which is not dissipated by the coolant is initially stored in that portion of the cutting tool which faces away from its clamped section. This prevents the heat making its way into the machine tool.

Air is particularly advantageous as a coolant because it can be discharged quite simply in the vicinity of the cutting tool and because with its use the cost of cooling the cutting tool is extremely small.

In accordance with another preferred embodiment, a coolant pipeline is provided on both sides of the slot in the cutting tool, so that component of the heat which penetrates through the heat insulating layer or which flows beyond the range of this layer towards the clamped portion of the cutting tool is effectively dissipated by the coolant medium so that there is no fear of undesirable temperature rise on the part of the machine tool.

Thanks to still another advantageous embodiment of the invention wherein a connection is provided on a coolant pipe for the coolant medium, and this coolant pipe has a connection to other coolant pipes by means of a transverse hole, it is possible to have only one connection for the coolant, even if there are several coolant pipelines.

The invention permits a wide variety of possible embodiments. One of these is shown schematically in the drawing and will be described in the following.

FIG. 1 shows a cross section through a cutting tool designed in accordance with the invention, whereby the section proceeds along the line I—I drawn in FIG. 2.

FIG. 2 shows a side view of the cutting tool partially cut away and shown in section.

In the case of the cutting tool shown in FIGS. 1 and 2 this comprises a cutting tool formed from a clamp holder 1 and a cutting plate 2 which can be clamped in a tool holder, which is not shown, in the normal manner by its shank 3. Inside it, transverse to the cutting plate 2, for cooling the cutting tool two coolant pipelines 4, 5 in the form of blind holes run from the side facing away from the cutting plate 2 into the clamp holder 1. From the coolant pipes 4 and 5 a multiplicity of holes 6, 6', 6", 7, 7' run to the outside of the clamp holder 1. There the clamp holder 1 is provided with a covering 8, 8' which is so inserted on spacing projections such as 9 and 10 in recesses 11 of the clamp holder 1 that the coolant can flow between the base surfaces of the recesses 11 and the covering 8, 8'. The recesses 11 and the covering 8 are shaped in such a way that the space between the base surfaces of the recesses 11 and the covering 8 is open only to the side of the clamp holder 1 which faces away from the cutting plate 2.

Air is employed preferentially as the cooling medium. This is supplied to the coolant pipe 5 via a connection 12. A transverse hole 13 connects the coolant pipe 5 with cooling pipe 4 so that the air proceeds from connection 12 also into coolant pipe 4. A plug 14 prevents the air from flowing backwards directly from transverse hole 13.

From the side of the cutting plate 2, transverse to it, in clamp holder 1 a slit 15 is provided which is filled with a layer of thermal insulation 16. A bolt 17 clamps the portion of clamp holder 1 which is separated by slit 15 firmly to the thermal insulating layer 16.

It is important that the coolant pipes 4 and 5 run on both sides of the slit 15 and thus of the thermal insulating layer 16, so that as little as possible of the heat can pass into the clamping portion of the clamp holder 1a and thus cause the temperature of the machine tool to rise excessively.

In conclusion it should be stressed that naturally instead of the two coolant pipes 4 and 5 described here, dependent on the configuration of the cutting tool it is possible to provide a multiplicity of coolant pipes.

What is claimed is:

1. A cutting tool for machine tools comprising:
   (a) A clamp holder carrying a cutting plate at one portion thereof;
   (b) At least one coolant pipe disposed within said clamp holder transverse to the cutting plate and terminating at a distance from said cutting plate;
   (c) A covering over at least part of said clamp holder and spaced therefrom; and
   (d) A multiplicity of outlet holes from said coolant pipe into the space between the covering and the clamp holder.

2. A cutting tool as claimed in claim 1, wherein the clamp holder is provided with recesses for receiving said covering and said covering is inserted in said recesses, said space being defined by the base surfaces of the recesses and the inner surface of the covering, said space being open only to the side which faces away from said cutting plate.

3. A cutting tool in accordance with claim 1 or 2, wherein said clamp holder has a slit which runs from one side transverse to said cutting plate, and a layer of thermal insulation in said slit, said thermal insulation being clamped in place by means of a bolt passing transverse to said slit.

4. A cutting tool as claimed in claim 3, wherein a coolant pipe is provided in the clamp holder on both sides of the slit.

5. A cutting tool as claimed in claim 4, wherein a connection is provided on one coolant pipe for introduction of cooling medium, and a transverse passage is provided communicating said one coolant pipe with the other coolant pipe.

6. A cutting tool as claimed in claim 1 or 2, wherein said clamp holder is provided with a plurality of coolant pipes, a connection is provided on one of said coolant pipes for introduction of the cooling medium, and a transverse passage is provided communicating said one coolant pipe with the other coolants pipes.

7. A cutting tool as claimed in claim 1 wherein air is the coolant.

* * * * *